C. LECHTENBERG.
HITCH FOR HAY LOADERS.
APPLICATION FILED DEC. 9, 1911.
1,145,026.
Patented July 6, 1915.
2 SHEETS—SHEET 2.
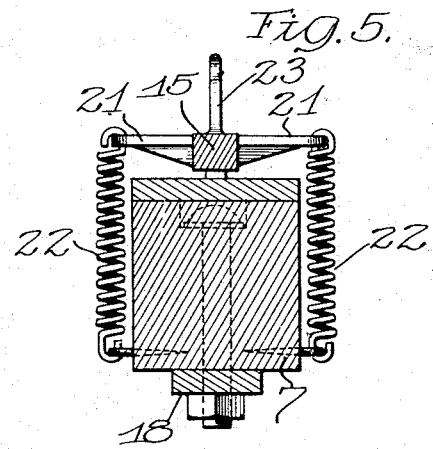
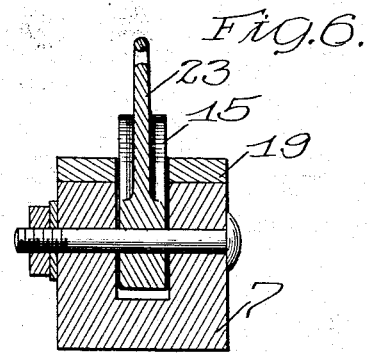
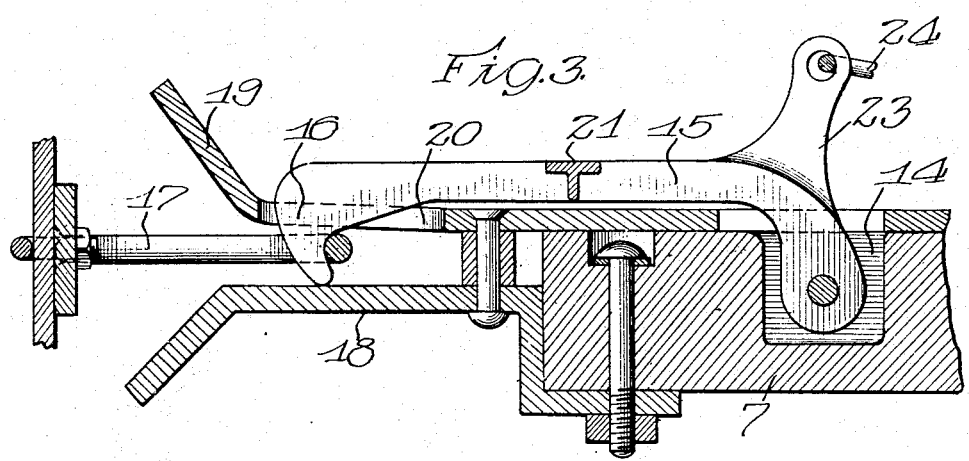
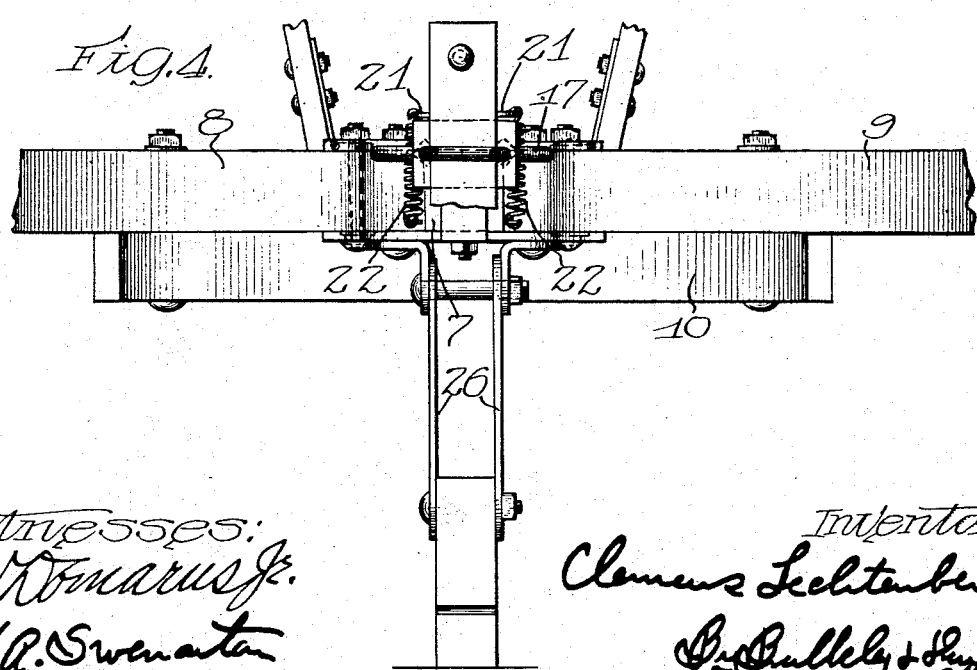
Witnesses:
Inventor:
Clemens Lechtenberg

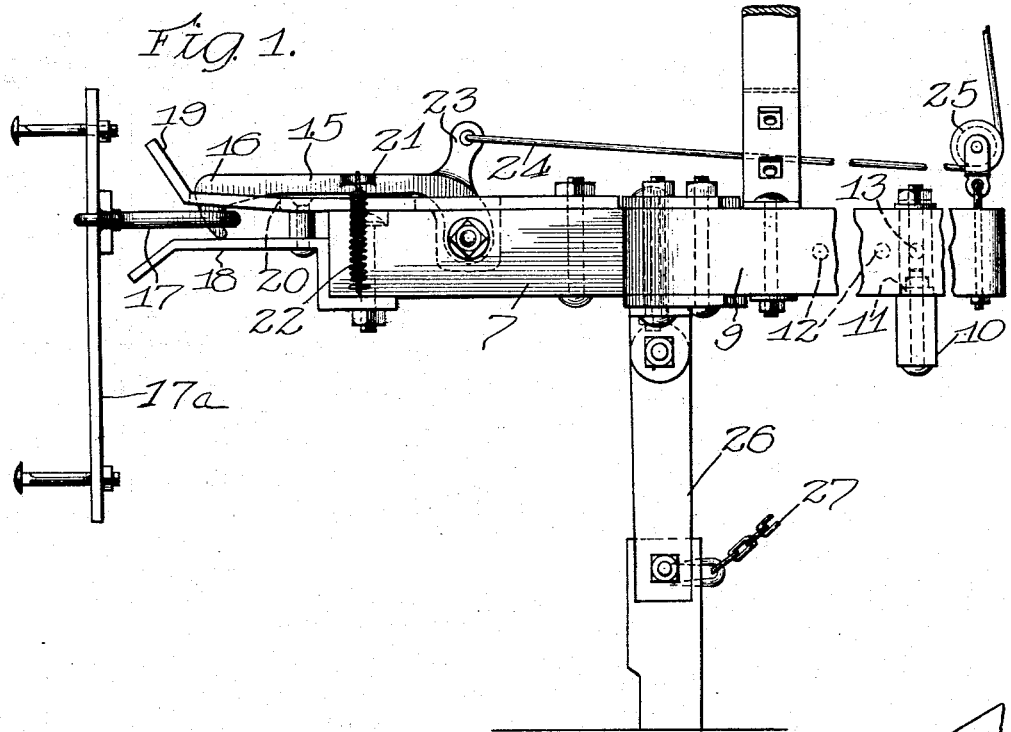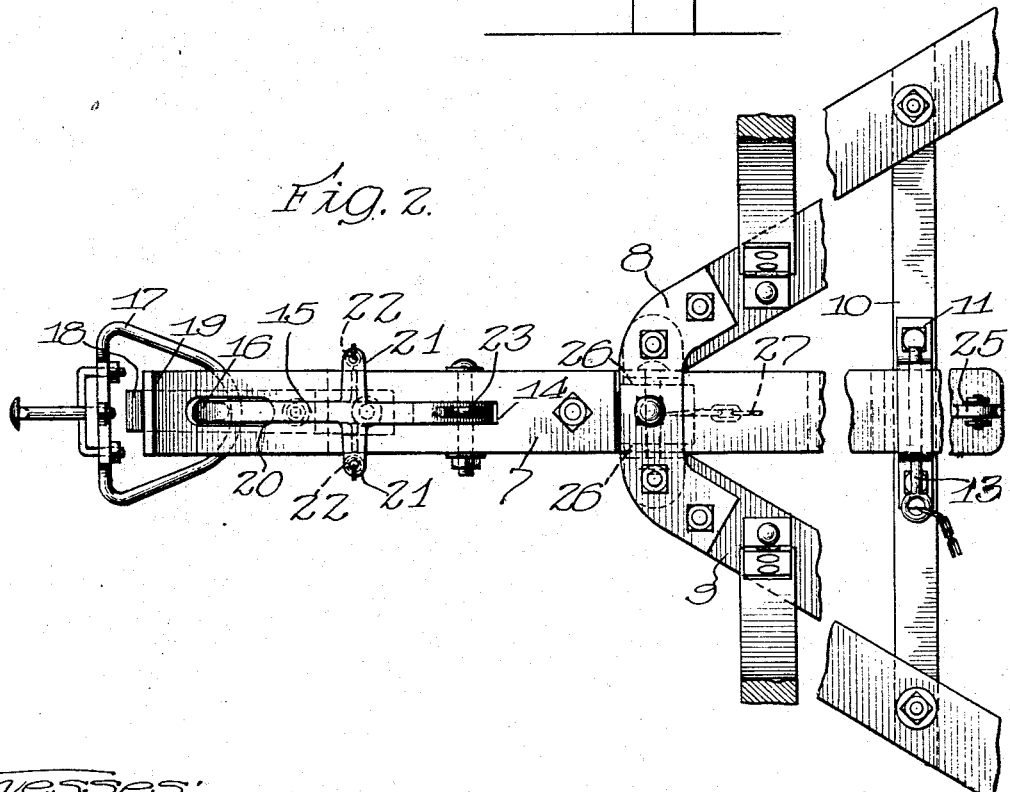

UNITED STATES PATENT OFFICE.

CLEMENS LECHTENBERG, OF CALMAR, IOWA, ASSIGNOR TO ROCK ISLAND PLOW COMPANY, OF ROCK ISLAND, ILLINOIS, A CORPORATION OF ILLINOIS.

HITCH FOR HAY-LOADERS.

1,145,026.  Specification of Letters Patent. Patented July 6, 1915.

Application filed December 9, 1911. Serial No. 664,699.

*To all whom it may concern:*

Be it known that I, CLEMENS LECHTENBERG, a citizen of the United States of America, and resident of Calmar, Winneshiek county, Iowa, have invented a certain new and useful Improvement in Hitches for Hay-Loaders, of which the following is a specification.

My invention relates to a new and improved hitch, and more particularly to a hitch for use in connection with hay loaders.

In attaching the wagon to a hay loader, it is desirable to have this wagon so connected with the loader that it can be readily disconnected therefrom when it has become fully loaded. At this time the attendant is usually on top of the loader, and it is, therefore, desirable to have means for operating the hitch to disconnect the wagon from the loader operative from a position on top of the loader.

My invention relates to a simple and improved hitch whereby a very secure connection can be obtained between the wagon clevis and the hay loader, and this hitch can be readily disconnected by the attendant on top of the load.

A further object of my invention is to provide an adjustment whereby the relative position between the wagon and the loader may be varied so that the hay can be fed onto the front of the rear end of the wagon, thus greatly assisting in the proper loading of the same.

A still further object of my invention is to provide a clevis that is vertically adjustable whereby an operator may have one or more wagons that may vary in height from the ground and may still be used in connection with the same hay loader.

These and other objects of my invention will be more readily understood by reference to the accompanying drawings, in which—

Figure 1 is a side elevation of my improved hitch. Fig. 2 is a plan view of the same. Fig. 3 is a cross-sectional view. Fig. 4 is an end view. Figs. 5 and 6 are sectional details.

As illustrated, I have shown a tongue 7 which is slidably mounted in the brace-bars 8 and 9 which are secured to the hay loader in any desired and well known manner. These brace-bars are connected by a cross-brace 10. Mounted upon this cross-brace there is an angular bracket 11 which passes over the tongue 7 and is provided with a pair of openings which are adapted to register with any one of a series of openings 12 in the tongue 7. A pin 13 is provided which is adapted to pass through these openings so as to secure the tongue 7 to the bracket in any one of a plurality of positions. The forward end of the tongue is provided with a recessed portion 14 within which there is pivoted the dog 15. The forward end of this dog is provided with a downwardly extending curved portion 16 which is adapted to engage with the wagon clevis 17. Secured to the forward end of the tongue there is a supporting brace 18 with which the end 16 of the dog 15 is adapted to engage when in locking position. Upon the upper surface of the tongue is likewise provided a plate 19 which is slotted at 20 so as to allow the end of the dog to pass therethrough. This plate 19 thus acts as a guide for the dog to prevent lateral movement of the same. At an intermediate point on the said dog there are a pair of laterally extending ears 21 to the ends of which are secured springs 22, the opposite ends of which springs are connected with the tongue 7. In this manner a spring tension is maintained upon the dog, tending to hold the same in locking position.

At the rear end of the dog there is an upwardly extending ear 23 to which is connected an operating cord 24. This cord extends rearwardly around the guide pulley 25 and then extends upwardly into a suitable position to be operated by the attendant on top of the load. It will be readily seen that by exerting a pull upon the cord 24 the dog 15 will be swung about its pivot so as to hold the curved end 16 out of engagement with the wagon clevis 17.

Pivoted beneath the tongue there is a jointed leg 26 which leg is adapted to support the tongue when this leg is in vertical position. As the hay loader is drawn forward this supporting leg merely drags along the ground. When the hay loader is stopped and then backed slightly, this supporting leg is brought to a vertical position in order to support the tongue. The chain 27 prevents this leg from swinging past vertical position. The wagon clevis 17 is vertically adjustable upon a vertical bar 17ª, which bar is bolted to the rear of the wagon rack. By means of this adjustment the clevises upon different wagons can be adjusted to the same height, so that they all engage properly with the dog 15.

When it is desired to disconnect the loader from the wagon, the team is first backed so that the post 26 reaches a vertical position, the chain 27 preventing this post from going beyond this position. The operator then pulls upon the cord 24 to unlock the coupling, and the team is then driven forward. The post 26 being in a vertical position, the pole of the loader is held at the same height at all times, and in order to couple a wagon to the loader it is merely necessary to back the wagon until the coupling is made and then, when the loader is drawn forward, the post 26 will trail backward. From this it will be seen that it is very important that the clevis 17 be made adjustable in a vertical plane, so that the couplings on the wagons will all be of the same height.

When it is desired to change the relative position of the wagon to the loader, so that the elevator of the loader will feed the hay to the forward or rear end of the wagon, it is merely necessary to withdraw the pin 13. The tongue 7 can then be moved longitudinally to bring the dog into proper position to engage the clevis, at which time the pin 13 can again be inserted. This adjustment is possible on account of the series of holes 12 which are provided in the tongue.

While I have illustrated one particular form of my invention, it will be understood that I do not wish to limit myself to the exact construction shown and described.

What I claim as my invention is:

1. In a hitch for use in connection with hay loaders, a vertical bar, a wagon clevis vertically adjustable by a sliding movement on said bar, a tongue, supporting brackets for said tongue, means for adjusting said tongue longitudinally in said brackets, a dog pivoted at one end within a recess in said tongue, said dog having a downwardly curved portion at its other end adapted to engage with said wagon clevis, a supporting plate secured to the forward end of said tongue for supporting the curved end of said dog, a guide plate secured to said tongue and leaving a slot in which the curved end of said dog operates for preventing lateral movement of said dog, spring means for maintaining said dog in locking position, and a cord for raising said dog out of locking position.

2. In a hitch for use in connection with hay loaders, a vertical bar, a wagon clevis vertically adjustable by a sliding movement on said bar, a tongue, supporting brackets for said tongue, means for adjusting said tongue longitudinally in said brackets, a dog pivoted at one end within a recess in said tongue, said dog having a downwardly curved portion at its other end adapted to engage with said wagon clevis, a supporting plate secured to the forward end of said tongue for supporting the curved end of said dog, a guide plate secured to said tongue and having a slot in which the curved end of said dog operates for preventing lateral movement of said dog, lateral ears on said dog extending beyond the sides of said tongue and spring-connected to each dog and to the tongue at the sides of said tongue for maintaining said dog in locking position, an arm upstanding from the pivotal end of said dog, and a cord attached to said arm for raising the dog out of locking position.

Signed by me at Rock Island Illinois this 28th day of November, 1911.

CLEMENS LECHTENBERG.

Witnesses:
 EDWARD M. HEYLMAN,
 GEO. H. SHELDON.